UNITED STATES PATENT OFFICE.

MARIE PIERRE PAUL GLOESS, LÉON PIERRE JACQUES DARRASSE, AND ETIENNE RAYMOND DARRASSE, OF PARIS, FRANCE.

PROCESS FOR THE TREATMENT OF SEAWEEDS FOR THE EXTRACTION OF THEIR ELEMENTS.

1,103,283.  Specification of Letters Patent.  Patented July 14, 1914.

No Drawing.  Application filed July 1, 1913. Serial No. 776,827.

*To all whom it may concern:*

Be it known that we, MARIE PIERRE PAUL GLOESS, of 2 Rue Malher, LÉON PIERRE JACQUES DARRASSE, of 13 Rue Pavée, and ETIENNE RAYMOND DARRASSE, of 13 Rue Pavée, all in the city of Paris, Republic of France, have invented a Process for the Treatment of Seaweeds for the Extraction of Their Elements, of which the following is a full, clear, and exact description.

This invention relates to a process for the treatment of sea-weeds, allowing to extract therefrom the iodin, the mineral salts, the mucilaginous material and the cellulose. The extraction of these elements may be complete or only partial, according as it is proposed to obtain one or the other or several of these elements and according to the sea-weeds to be treated.

The present process is substantially characterized by the fact that the sea-weeds are subjected to the action of an oxidizing agent in neutral or acid solution, such for instance as peroxid of hydrogen or chlorin, which allows of extracting the iodin without dissolving the mucilaginous material. Moreover, the said process is characterized by the fact that the sea-weeds after extraction of the iodin are subjected to the action of an oxidizing agent in alkaline solution of suitable concentration, which allows of extracting and transforming at the same time the mucilaginous material for bringing it, according to circumstances, in different states or conditions.

In practice, the process comprises preferably the succession of the following operations which vary according to the elements to be extracted from sea-weeds:

I. For the successive extraction of iodin, mineral salts, mucilaginous material and cellulose:

A. The sea-weeds are subjected to the action of a solution of peroxid of hydrogen or of a solution of chlorin which must be neutral or acid, but in no case whatever alkaline, so as not to dissolve the mucilaginous material which is dissolved by the alkalis. This operation frees the sea-weeds from the iodin which is dissolved in the solution at the same time as the mineral salts, while the mucilaginous material and the cellulose remain undissolved. The iodin may be precipitated or directly extracted from this solution or it may be extracted from the mother-liquors after evaporation or crystallization of the mineral salts.

B. The sea-weeds, after this first operation, are subjected to the action of a solution of peroxid of sodium or of hypochlorite of soda which acts differently according to its concentration.

1. If the solution of peroxid of sodium does not exceed 2.50% or that of hypochlorite of soda an equivalent percentage, the mucilaginous material although being dissolved is transformed only into a more viscous material, especially when operating in the cold and that any rise of temperature is avoided. The solution of mucilaginous material thus obtained, which is alkaline, may be used as such without other preparation or after neutralization. The solution may also be precipitated by an acid for obtaining a mucilaginous material in the form of a jelly to which, in order that this material may be dissolved, must be added an alkali. Finally, the solution may also be evaporated in the dry state. The mucilaginous material obtained by this treatment may be used as alimentary, finishing, sizing, thickening, emulsifying material, as material for rendering impermeable threads, fabrics, papers—to that effect the threads, fabrics or papers are impregnated with this material and afterward immersed in a solution of mineral acid or of a metallic salt—as material rendering water-proof the mortars and agglomerates of lime, cement, the mucilaginous material dissolved in the tempering water forms with the earthy salts, composing the mortars and agglomerates, insoluble materials.

2. On the other hand, if, after extraction of the iodin, the sea-weeds, instead of being treated with a solution weaker than 2.50% of peroxid of sodium, are treated with a more concentrated solution, the mucilaginous material is transformed into a still more soluble and viscous material possessing very high detersive properties. The product thus obtained may advantageously replace the soaps and lyes and it is so much the more advantageous that its salt of magnesium is soluble.

C. In the two above cases, after separation of the mucilaginous material, there remains only the cellulose.

II. For the successive extraction of the iodin, mineral salts, mucilaginous material and cellulose, without separating the one from the other these two latter materials, the first operation, that described in A, suffices.

Claims:

1. A process for the treatment of sea-weeds for extracting the iodin, the mineral salts, the mucilaginous material and the cellulose therefrom, consisting in treating the sea-weeds with non-alkaline oxidizing agent, for extracting the iodin therefrom, and then with an alkaline oxidizing agent for simultaneously extracting and transforming the mucilaginous material.

2. A process for the treatment of sea-weeds for extracting the iodin, the mineral salts, the mucilaginous material and the cellulose therefrom, consisting in treating the sea-weed with a non-alkaline oxidizing agent thereby removing the iodin and the mineral salts of the sea-weeds, then treating the sea-weed with an alkaline oxidizing agent thereby dissolving the mucilaginous material and transforming it into a more viscous and detersive material, and finally obtaining the cellulose as a residual element.

The foregoing specification of our process for the treatment of sea-weeds for the extraction of their elements signed by us this 20th day of June 1913.

MARIE PIERRE PAUL GLOESS.
LÉON PIERRE JACQUES DARRASSE.
ETIENNE RAYMOND DARRASSE.

Witnesses:
HANSON C. COXE,
RENÉ THIRIOT.